United States Patent [19]

Caggiano

[11] Patent Number: 4,861,632

[45] Date of Patent: Aug. 29, 1989

[54] LAMINATED BAG

[76] Inventor: Michael A. Caggiano, 710 N. Myers St., Burbank, Calif. 91506

[21] Appl. No.: 182,950

[22] Filed: Apr. 19, 1988

[51] Int. Cl.$^4$ .................... B65D 81/26; B65D 30/08
[52] U.S. Cl. .................... 428/35.2; 206/204; 383/109; 426/126; 426/127; 428/34.3; 428/35.3; 428/35.4; 428/35.7; 428/131; 428/192; 428/215; 428/81; 428/507; 428/537.5; 428/513; 428/514; 428/464
[58] Field of Search ............ 428/35, 192, 81, 34.3, 428/35.2, 35.4, 35.7; 426/124–129, ; 604/367; 206/204; 383/109

[56] References Cited

U.S. PATENT DOCUMENTS

| | | | |
|---|---|---|---|
| 1,538,277 | 5/1925 | Dula | 426/126 |
| 2,400,390 | 5/1946 | Clunan | 206/527 |
| 2,593,592 | 4/1952 | Miller | 99/446 |
| 3,026,209 | 3/1962 | Niblack et al. | 426/124 |
| 3,040,949 | 6/1962 | Foote | 229/2.5 R |
| 3,084,984 | 4/1963 | Adler | 312/31 |
| 3,127,828 | 4/1964 | Fine | 99/446 |
| 3,136,468 | 6/1964 | Keller | 426/126 |
| 3,320,075 | 5/1967 | Lemmons | 426/393 |
| 3,343,663 | 9/1967 | Siedler | 426/126 |
| 3,411,433 | 11/1968 | Christopher | 99/446 |
| 3,560,223 | 2/1971 | Turbak | 426/105 |
| 3,809,223 | 5/1974 | Kendall | 428/913 |
| 3,955,019 | 5/1976 | Keith | 428/35 |
| 4,096,309 | 6/1978 | Stillman | 428/285 |
| 4,332,845 | 6/1982 | Nawata et al. | 428/35 |
| 4,391,833 | 7/1983 | Self et al. | 426/523 |
| 4,410,578 | 10/1978 | Miller | 428/117 |
| 4,423,080 | 12/1983 | Bedrosian et al. | 426/124 |
| 4,515,840 | 5/1985 | Gatward | 428/35 |
| 4,629,064 | 12/1986 | Barner | 206/204 |
| 4,657,133 | 4/1987 | Komatsu et al. | 206/204 |
| 4,657,809 | 4/1987 | Mays et al. | 428/212 |

FOREIGN PATENT DOCUMENTS

| 1393091 | 5/1975 | United Kingdom | 428/35 |
|---|---|---|---|
| 1604830 | 12/1981 | United Kingdom | 428/35 |

Primary Examiner—Ellis P. Robinson
Assistant Examiner—Archene A. Turner
Attorney, Agent, or Firm—Cislo & Thomas

[57] ABSTRACT

A laminated packaging material from which package type containers are fabricated for storing or transporting a variety of products ranging from dry food-stuffs to electronic equipment where maintenance of a dry environment is a requirement, comprising an outer imperforate water impervious layer, a middle layer of absorbent material and an inner perforated moisture impervious layer.

14 Claims, 2 Drawing Sheets

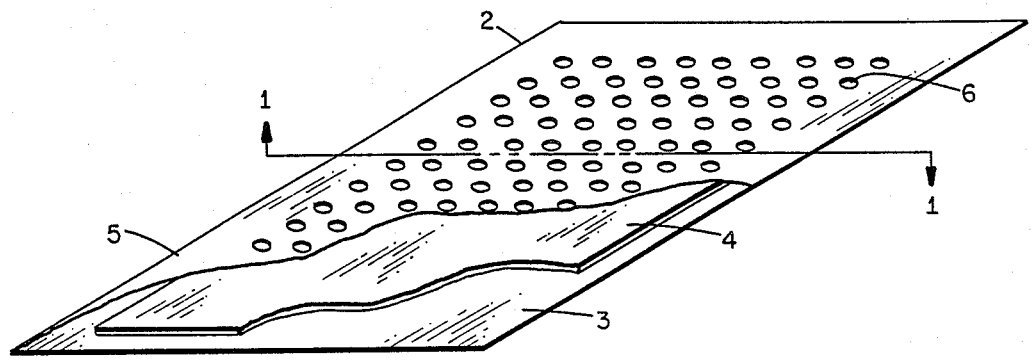
Fig. 1.
Fig. 2.
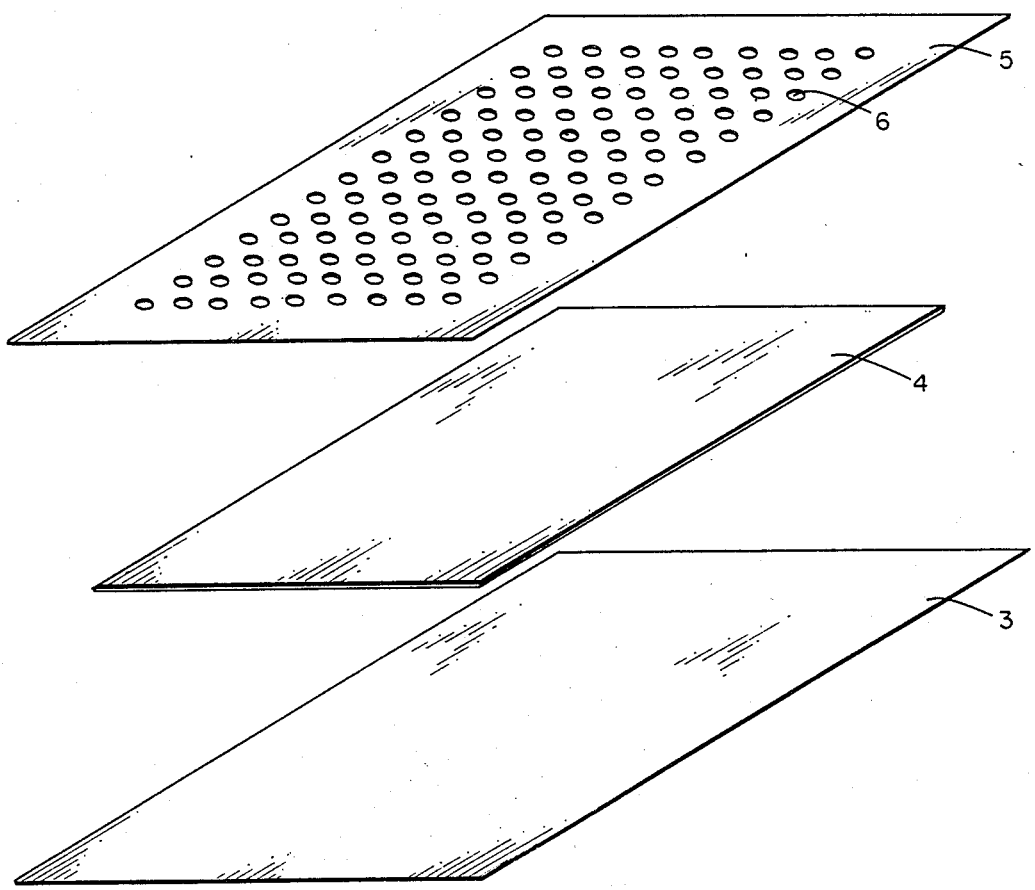

LAMINATED BAG

BACKGROUND-FIELD OF INVENTION

This invention relates to a storage bag of laminated construction which will rapidly establish and maintain a dry environment inside of said storage bag by absorbing ambient moisture therein present.

BACKGROUND-DISCUSSION OF RELATED ART

A variety of bags, trays, pads and laminated foils have been developed to absorb fluids from the products contained therein. Adler, U.S. Pat. No. 3,084,984, devised a bag type container of multiple wall design for packaging dry food products. Imperforate inner and outer layers formed from moisture resistant materials such as wax paper, glassine or thermoplastic are sealed at the ends. A plurality of sheets of absorbent material such as paper toweling are sandwiched inbetween the outer and inner layers. At least one of the absorbent layers is impregnated with a desiccant substance to increase the moisture absorbing capacity. In Barner U.S. Pat. No. 4,629,064 describes a storage bag for moisture retentive foods comprising an outer water impermeable bag and a smaller inner bag of absorbent paper to retain exuded fluids.

In order to improve the appearance and shelf life of packaged meat and poultry products trays similar laminar design have been ultilized. Niblack et al., U.S. Pat. No. 3,026,209 devised a ray comprising a lower moisture impervious layer, a middle layer with supports and an absorbent material impregnated with bacteriostatic agents, and an upper perforated layer through which suspended material and exuded fluids may pass into the absorbent layer. Foote in U.S. Pat. No. 3,040,949 employed a tray comprising a nonperforated lower layer and perforated upper layer fabricated from relatively nonabsorbent pulp material said layers being joined around the periphery. An absorbent pulp layer is sandwiched between these two layers which traps fluids exuded from the packaged meat or poultry products. Miller in U.S. Pat. No. 4,410,578 invented an absorbent pad for a receptacle designed to absorb fluids from moisture exuding food products such as meat and poultry. The device comprises an upper nonperforated liquid impermeable plastic sheet overlying an absorbent pad and a perforated bottom plastic sheet underlying the absorbent layer. Spacers capable of supporting a compressive load are placed between the upper and lower layers. The device is contained within a tray. Fluids exuded from the food products placed on the upper sheet flow around the pad and are absorbed by capilliary action into the inner layer. By this means the food products are kept away from the exudate resulting in enhanced shelf life and appearance. In Lemmons U.S. Pat. No. 3,320,075 has invented a method for packaging prechilled food products such as meat, poultry and moisture exuding vegetables. The method consists of depositing a layer of dry ice on the bottom of a shipping carton and placing over the layer of refrigerant a laminated pad comprising a lower layer of absorbent material and an upper spacer layer of perforated plastic.

Patents have been granted on devices of similar design for use in baking or broiling. Miller in U.S. Pat. No. 2,593,592 designed a grill of mat construction for absorbing grease and fat from broiling meat. This mat is constructed from heat resistant material such as asbestos and comprises a lower nonperforated layer, an upper perforated layer and two corrugated middle layers separated by a perforated layer. The hot grease flows through the perforations and is absorbed in the inner corrugated layers. Fine in U.S. Pat. No. 3,127,828 has designed a broiling pad having a laminated structure with a plurality of layers of porous, liquid absorbent fibrous material such as paper. Opposite sides of the pad are covered with metal foil. The foil on the upper side is perforated to permit juices to flow into the interior to be absorbed by the fibrous layer. Christopher in U.S. Pat. No. 3,411,433 developed a foil material from which baking containers may be fabricated. The foil has an upper perforated layer and a lower nonperforated layer associated together with a moisture absorbent material such as a fabric mesh sandwiched inbetween. Grease and moisture exuded during the baking process flow into the absorbent pad resulting in improved baking characteristics.

Various laminated packaging materials have been developed which protect the packaged materials from moisture, light and air and in some cases maintain the moisture content of the contents of the package. Dula in U.S. Pat. No. 1,538,277 developed a package for food and commodities from a laminated sheet. The sheet comprises an inner layer of metal foil, such as tin foil, attached with a layer of paraffin wax to a middle wax impregnated sheet of paper and an outer paper wrapper coated with a waxy material. Said package hermetically seals the contents of the package. Clunan in U.S. Pat. No. 2,400,390 developed a vacuum packaging sheet material formed by adhesively laminating aluminum or tin foil to Pliofilm, a chlorinated rubber. The Pliofilm edges of the sheet are heat sealed under vacuum to form a moisture, light and air resistant package. In U.S. Pat. No. 3,560,223 Turbak has patented a liver sausage product cooked in situ in a multilayer casing. The tubular casing is formed by laminating layers of thermoplastic film to both sides of a metal foil. The sealed tube formed therefrom is relatively impervious to moisture and oxygen transmission. Stillman in U.S. Pat. No. 4,096,309 has invented a self-sealing packaging laminate of high strength and capacity. The laminate is composed of an outer sheet of non-woven spun-bonded polymeric filament such as polyethylene or polyester, a second layer of flexible metal foil, preferably aluminum, and an inner layer of heat sealable polyolefin. A face ply of smooth non-porous material such as Kraft paper is bonded to the outer spun-bonded polymeric filament layer. Moyle in U.S. Pat. No. 4,364,989 has devised a multilayer packaging material for snack food. The material comprises an outer layer of polypropylene, a low density polyethylene laminator and an inner layer which is a coextrusion. The inner coextruded layer comprises a first layer of high density polyethylene, a second layer of polypropylene and a third layer of ethylene methyl acrylate. The ethylene methyl acrylate surface is coated with an emulsion of polyvinylidene chloride, which seals the inner layers together upon application of heat.

SUMMARY OF THE INVENTION

My invention consists of a laminated packaging material from which package type containers are fabricated for storing or transporting a variety of products ranging from dry foodstuffs to electronic equipment where maintenance of a dry environment is a requirement. It is therefore a principle purpose of my invention to provide a dry environment for goods sealed inside a package formed from the laminated material. My laminated packaging material comprises an outer imperforate water impervious layer, a middle layer of absorbent material and an inner perforated moisture impervious layer. Any external moisture penetrating the package is trapped by the absorbent layer. Moisture or humidity inside the package is rapidly absorbed through the perforations into the absorbent layer. Thus it is seen that my packaging material when sealed to form a container will provide a dry environment for any object sealed within the package. Adler's laminated packaging material consists of both outer and inner imperforate sheets of moisture resistant thermoplastic sheets. The rate of transmission of liquid water or water vapor contained inside of the package through the imperforate water resistant layer to the inner absorbent layer is very slow allowing humid or moist conditions within the package to remain for a considerable length of time in contrast to the rapid absorption of moisture through the perforated inner layer of my packaging material. A principle object of the inventions of Barner, Foote, Niblack, Lemmons and Miller is to absorb excess moisture and fluids from food products, but to simultaneously maintain a humid atmosphere so that the packaged foodstuffs do not become dehydrated. The inventions of Christopher, Miller and Fine are designed to absorb excess grease and moisture produced during baking and broiling. At these high temperatures the more volatile components of the exuded liquified fat and all of the water are not absorbed but remain in the vapor state preventing the meat or baked goods from becoming dried out. All of the patents discussed above teach away from my invention.

The various laminated packaging materials described by Dula, Clunan, Turbak, Stillman and Moyle are designed to prevent moisture from entering or leaving the package, but are not designed to absorb moisture either penetrating the laminated material or present inside of the container formed from said materials. My invention solves the problem of rapidly establishing and maintaining a dry environment inside of a package. None of the above-mentioned inventions address this problem.

Square or rectangular sheets of my laminated material may be sealed at the edges to form bag type containers. Additionally developmental surface patterns formed from my material ma be used to wrap various sized shipping containers in the form of boxes, tubes etc. The outer and inner layers may be formed from metal foil, preferably aluminum, or flexible thermoplastic film, such as polyolefin, polyester or polyvinylidene chloride. The absorbent layer consists of a plurality of sheets of absorbent paper such as paper toweling. The thickness of the absorbent layer may be increased to give greater absorbtivity. In a further embodiment the absorbent layers may be impregnated with a desiccant agent, such as calcium chloride, silica gel or magnesium perchlorate to increase the moisture absorbing capacity. Another embodiment comprises adhesively securing the edges of the paper toweling to form a bag which is filled with granular silica gel to dramatically increase the ability of the absorbent layer to retain moisture. A still further embodiment consists of impregnating the absorbent layer with a fungicidal agent to inhibit the growth of any fungi during long periods of storage by the absorbent layer. An additional embodiment comprises the addition of activated charcoal to a sealed bag formed from the absorbent paper. The activated charcoal layer serves to absorb vapors other than water present inside the sealed package.

BRIEF DESCRIPTION OF THE DRAWINGS

FIG. 1 is an isometric view partly broken away of a sheet of the laminated packaging material.

FIG. 2 is an exploded isometric view showing the three layers of the laminate.

DESCRIPTION OF THE PREFERRED EMBODIMENT

Figures 3, 3A, 4, 5:
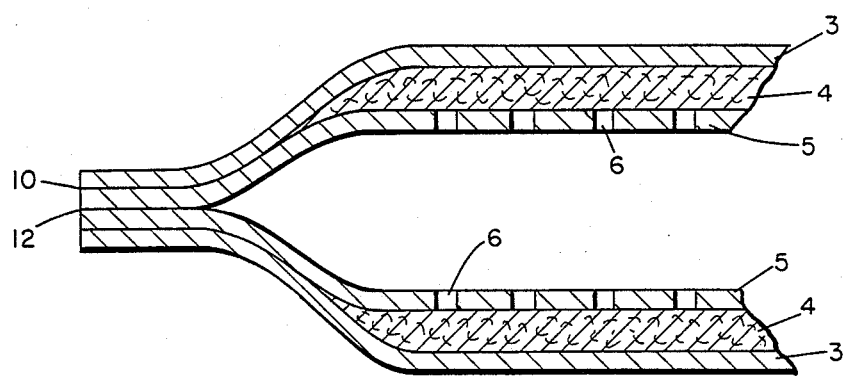
FIG. 3 is an enlarged partial cross-sectional view of the laminated packaging material taken along line 1—1 of FIG. 1.
FIG. 3a is a fragmental enlarged view of the laminated packaging material showing the absorbent layer adhesively secured to at least one of either the outer or inner layer making up the laminate.
FIG. 4 is an enlarged partial cross-sectional view of a bag type container formed by attaching the ends of two of the laminated sheets.
FIG. 5 is an enlarged partial cross-sectional view of an alternate embodiment of the laminated packaging material wherein the middle layer comprises a bag containing a desiccant or absorbent agent.

Considering the drawings in greater detail FIG. 1 shows the laminated packaging material 2 which comprises an outer imperforate layer 3 or moisture impermeable material overlying and covering a layer of moisture absorbent material 4 an an inner perforated layer 5 of moisture impermeable material. The laminated sheet 2 is shown in rectangular shape for illustrative purposes, however there are no limitations on the shape or pattern in which the packaging material may be fabricated. FIG. 3 shows the detailed construction of the laminate in an enlarged cross-sectional view. FIG. 2 shows an exploded view of the laminate, illustrating the position of the laminar layers before sealing.

The absorbent layer typically is comprised of two or three sheets, preferably consisting of sheets of paper toweling. The thickness may be varied to increase the moisture absorbing capacity. The absorbent layer may or may not be adhesively attached to the inner surface of the outer layer of moisture impermeable material 3. In an alternative embodiment the absorbent layer may be impregnated with a desiccant such as calcium chloride, silica gel, magnesium perchlorate or any other suitable desiccant material to further enhance the moisture absorbing capacity. FIG. 5 shows a further embodiment wherein the moisture absorbing capacity is greatly increased comprising a thin layer of granular silica gel 14 contained within a pouch 15 formed by adhesively sealing the peripheral edges 16 of layers of the paper toweling. The pouch is sealed between the outer and inner layers of moisture impermeable material as before.

The peripheral edges of the outer and inner sheets extend beyond the absorbent layer 4 by at least $\frac{1}{4}''$ and are sealably attached together as shown in FIG. 3 at 10 by any suitable means, such as crimping, heat sealing or use of an adhesive. The inner sheet 5 is apertured by a plurality of perforations, FIG. 1 at 6, which are substantially uniformly distributed over its full area. The circular perforations are shown centered in a square pattern the centers being $1\frac{1}{2}''$ to $2''$ apart with a diameter of $\frac{1}{2}''$.

The laminated packaging material 2 in its preferred embodiment shown in FIG. 3 comprises an imperforate outer layer 3 and perforate inner layer 5 composed of moisture impermeable material. For example the layers may comprise a flexible thermoplastic film, such as polyvinylidene chloride, polyethylene, polypropylene or a metal foil, such as aluminum, having a thickness of between 1.0 to 4.0 mils, with a preferred thickness of 2.75 mils. The perforations 6 in the inner layer 5 consist of a regular pattern covering substantially the entire area of the inner sheet with the perimeter of the perforated area being one inch less on all edges than the perimeter of the absorbent sheets 4. The perforations are centered 1½" to 2" apart with diameters of 14 between ⅛" to ½", with a preferred diameter of ½". The absorbent layer 4 is sandwiched between the inner and outer layers and adhesively attached to the inner surface of the imperforate outer layer 3. The absorbent material preferably consists of paper toweling with a thickness between 6 to 18 mils, with a preferred thickness of 12 to 13 mils.

A moisture resistant container may be formed from the laminated packaging material by sealably attaching the peripheral edges of one or more sheets together. FIG. 4 shows two sheets of material placed together and sealed at 12. For example two sheets may be adhesively or heat sealed on three sides, the contents placed inside the package so formed, and the remaining edges of the laminate sealed forming a moisture resistant package. A single sheet of laminated packaging material may be folded on itself and the edges sealed to form a container. Examining FIG. 4 it is readily seen that any moisture inside of the package rapidly passes through the perforations in the inner sheet and is absorbed by the absorbent paper. In the alternate embodiments employing desiccant agents the moisture will be transferred from the absorbent paper to the desiccant and tenaciously retained thereby rapidly establishing a dry environment inside of the package. Any external moisture which slowly penetrates the outer imperforate moisture impermeable sheet through interstitial spaces, rents or tears will be rapidly absorbed in like fashion maintaining a continuous dry condition inside the package.

While the invention has been specifically described with respect to the disclosed embodiments, those of ordinary skill in the art will at once recognize that the invention may be practiced in a variety of ways.

For example the particular size and spacing of the apertures may vary. The absorbent layer need not be adhesively secured as at 13 and the spacing needed to obtain parameters necessary to form effective bagging, wrapping or entraining may be varied. It is only essential to the practice of the invention that an inner chamber or absorbent layer be provided having communication, by plurality of passageways or openings, to the interior of the package formed by the packaging material of this invention.

In the drawings and specification both the preferred and alternative embodiments of my invention have been disclosed.

Other embodiments and uses for the present invention will be readily apparent to those skilled in the art intended to fall within the scope of this invention. Therefore the disclosures and descriptions are to be taken as illustrative and are not intended to be limiting.

I claim:

1. A sealed bag container formed from a laminated packaging material able to establish and maintain a dry environment within said container comprising:
   a) an outer imperforate moisture impervious layer defining an interior within;
   b) a middle moisture absorbent layer within said interior;
   c) an inner layer apertured by a plurality of perforations substantially uniformly distributed over the whole area circumscribed by a perimeter smaller than the perimeter of said middle absorbent layer located within said interior;
   d) said outer and inner layers overlying and covering said absorbent layer and having their peripheral edges extending beyond the edges of said absorbent layer, said inner and outer layers being sealed together at their peripheral edges to enclose said absorbent layer, wherein said sealed bag container is formed by attaching the peripheral edges of one or more sheets of said packaging material together, said inner perforated layers being in a superimposed configuration thereby creating a moisture trap space.

2. The packaging material according to claim 1, wherein
   (a) said absorbent layer comprises a plurality of sheets of paper toweling having a thickness within the range of 6 to 18 mils;
   (b) said inner and said outer moisture impervious layers consist of aluminum foil having a thickness within the range of 1.0 to 4.0 mils; and
   (c) said inner and said outer moisture impervious layers are attached at their peripheral edges by crimping or are adhesively affixed.

3. The packaging material according to claim 1, wherein
   (a) said absorbent layer comprises a plurality of sheets of paper toweling having a thickness within the range of 6 to 18 mils;
   (b) said inner and outer moisture impervious layers consist of a thermoplastic film having a thickness within the range of 1.0 to 4.0 mils; and
   (c) said inner and outer moisture impervious layers are attached at their peripheral edges by heat sealing or adhesively affixed.

4. The packaging material according to claim 3, wherein the said thermoplastic film comprises polyvinylidene chloride.

5. The packaging material according to claim 3, wherein the said thermoplastic film comprises polyethylene.

6. The packaging material according to claim 3, wherein the said thermoplastic film comprises polypropylene.

7. The packaging material according to claim 2 wherein the absorbent layer of paper toweling is impregnated with a desiccant agent.

8. The packaging material according to claim 3, wherein the absorbent layer of paper toweling is impregnated with a fungicidal agent.

9. The packaging material according to claim 2 wherein the peripheral edges of the absorbent paper toweling are adhesively attached to form a pouch filled with a granular absorbent agent said pouch being adhesively affixed to the inner surface of said outer layer said outer and inner layers sealably attached to contain said pouch inbetween.

10. The packaging material according to claim 9, wherein the granular absorbent agent is silica gel.

11. The packaging material according to claim 9, wherein the granular absorbent agent is activated charcoal.

12. The laminate in accordance with claim 1 wherein said absorbent material is a cellulose layer.

13. The laminate in accordance with claim 12 wherein said cellulose layer is absorbent paper which is adhesively secured to one of aid outer and inner layers.

14. The packaging material according to claim 3 wherein said thermoplastic film comprises a vinylidene chloride-vinyl chloride copolymer.

* * * * *